United States Patent Office 3,329,661
Patented July 4, 1967

3,329,661
COMPOSITIONS AND TREATED ARTICLES THEREOF
Samuel Smith, Roseville, and Patsy O. Sherman, Bloomington, Minn., assignors to Minnesota Mining and Manufacturing Company, St. Paul, Minn., a corporation of Delaware
No Drawing. Filed Dec. 1, 1964, Ser. No. 415,188
21 Claims. (Cl. 260—79.3)

The present invention relates to novel and useful fluorine-containing copolymers. In one aspect the invention relates to fluorocarbon group-containing surface treating agents. In another aspect it relates to treated substrates which are durably oil and water repellent.

Various fluorocarbon group-containing polymers suitable for treating surfaces to render them oil and water repellent are known, thus see United States Patent Nos. 2,803,615, 3,068,187 and 3,102,103. The resulting fluorocarbon surface treatments, although very effective have often been adversely affected by repeated cleanings. It is therefore much to be desired to improve the durability of such treatments, particularly in articles which are repeatedly laundered or dry-cleaned in normal use such as clothing and other fabric and leather articles. In the present invention certain reactive groups in the polymer are utilized to obtain improved durability to cleaning.

An object of this invention is to provide certain novel fluorocarbon group-containing polymers.

Another object of this invention is to provide novel oil and water repellent treatments for substrates.

Another object of this invention is to provide new and useful oil and water repellent treating agents.

Another object of this invention is to provide oil and water repellent treatments of improved durability to laundering and dry-cleaning.

Another object of this invention is to provide solvent and aqueous dispersions of fluorocarbon group-containing polymers which are capable of being dispensed from pressurized aerosol containers.

Still another object of this invention is to provide fluorocarbon copolymers which contain recurring reactive groups.

Still another object of the invention is to provide durably oil and water repellent articles.

Still another object of the invention is to provide durably oil and water repellent fibers.

Yet another object of the invention is to provide durably oil and water repellent textile fabrics.

Various other objects and advantages will become apparent to those skilled in the art upon reading the accompanying description and disclosure.

The polymers of the present invention have carbon to carbon main chains or back-bones and contain recurring monovalent perfluorocarbon groups having from four to eighteen carbon atoms and recurring epoxy groups. The polymers contain at least 20 percent of fluorine which is in the perfluorocarbon groups and at least 0.05 percent oxirane oxygen. Preferably they contain from 20 to 70 percent fluorine and from 0.05 to 2 percent oxirane oxygen, these ranges being given on a weight basis. They comprise a minimum of two different recurring units, one containing the fluorocarbon group and one containing the epoxy group.

The polymers of the invention are prepared by addition copolymerization of at least two different ethylenically unsaturated monomers through their ethylenically unsaturated groups, one monomer containing the fluorocarbon group and the other containing the epoxy group. Each recurring unit of the polymer is thus the result of the addition polymerization of a monomer molecule.

Certain of the polymers of the invention contain more than two kinds of recurring groups, e.g., a plurality of different fluorocarbon containing units, a plurality of different epoxy-containing units and/or one or more recurring units which contain neither fluorocarbon nor epoxy. Further, the different types of units can appear randomly or in some particular arrangement. Thus, block and graft copolymers (i.e., segmented copolymers) are included as are homogeneous polymers (in which the component monomeric units appears in more or less random fashion therein). Segmented copolymers are discussed at some length in U.S. Patent 3,068,187.

The fluorocarbon groups of the polymers are saturated and contain from 4 to 18 fully fluorinated carbon atoms. It is of critical importance that the fluorocarbon groups contain at least 4 carbon atoms to provide oil and water repellent properties and the preferred number is 6–10. Highly satisfactory properties of oil and water repellence and relative economy of production are combined in products in which the fluorocarbon groups contain 6 to 10 carbon atoms.

The complete fluorocarbon group can be a perfluoroalkyl group having an open (acyclic) straight- or branched-chain, or a cyclic structure (e.g. a perfluorocyclohexyl group having a 6-membered ring structure) or it can consist of a combination of perfluoroalkyl straight chain and perfluorocycloaliphatic groups. The perfluorocarbon group may be bonded to a sulfur-atom of the molecule through either a cyclic or acyclic carbon atom (that is, this carbon atom may or may not be in a ring) and two carbon atoms of the fluorocarbon group may be linked together by an oxygen atom or three carbons may be linked together by a nitrogen atom, since oxygen and nitrogen provide very stable linkages between fluorocarbon groups and do not interfere with the highly stable and inert character of the complete fluorocarbon group or structure, as is shown, for instance, in U.S. Patent Nos. 2,500,388 and 2,616,927.

The copolymers of the invention are useful for imparting highly durable repellence to oil and water and resistance to soiling to a variety of substrates. Fibrous and porous surfaces may be treated with the polymers to achieve these results. Illustrative articles to be treated are textiles, paper, wood, leather, fur, and asbestos. Among the articles which are advantageously treated are apparel, upholstery, draperies, carpeting, bags, containers, luggage, hand bags, shoes and jackets.

When the substrate treated is a fabric, 0.5 to 5 percent (preferably 0.1 to 1 percent) by weight of copolymer based on the weight of the fabric produces desirable surface properties. Illustrative textiles which can be advantageously treated with the copolymers of this invention are those based on natural fibers, e.g. cotton, wool, mohair, linen, jute, silk, ramie, sisal, kenaf, etc. and those based on synthetic fibers, e.g. rayon, acetate, acrylic, polyester, saran, azylon, nytril, nylon, spandax, vinyl, olefin, vinyon and glass fibers (these designations of synthetic fibers are the proposed generic terms set up by the Federal Trade Commission). The treatment of these fabrics with the compositions of this invention imparts no adverse effect to the hand of the fabric and in some cases has a softening effect, thereby improving the hand.

It is not known with certainty why the polymers of the present invention which contain epoxy groups exhibit superior properties of durability when compared to similar polymers containing no epoxy radicals. In some cases the substrates coated are believed to contain groups which react with the epoxy groups to anchor them more firmly. In other cases small amounts of primary diamines or acidic compounds can be added with the fabric treatment and these are believed to bring about a degree of cross-linking of the polymer. The present invention, however, is in no way limited by the mechanism of its operation.

The polymers of the invention are applied as surface treatments by known methods of coating such as spraying, brushing or impregnation from solutions or dispersions thereof in aqueous or organic solvents. A particularly convenient method of application is as an aerosol spray from a pressured aerosol container. The polymers may be used as the sole component in the treating vehicle or as a component in a complex multi-ingredient formulation. The substrate can be treated with one or more conventional finishes (such as mildew preventives, moth resisting agents, crease resistant resins, lubricants, softeners, sizes, flame retardant, antistatic agents, dye fixatives, and water repellents) and then with the copolymer or alternatively with a conventional finish or finishes and the copolymer simultaneously. In the treatment of paper the polymer may be present as an ingredient in a wax, elastomer or wet strength resin formulation.

The general structural formula of the fluorocarbon containing monomers employed in this invention (and from which the fluorocarbon group containing units of the polymers are formed) is $R_fP$ where $R_f$ is a fluorocarbon group as previously defined and P is a radical containing a group which is polymerizable by free radical mechanisms. Illustrative types of these fluorine-containing monomers are the acrylate, methacrylate and α-chloroacrylate esters (acrylate-type esters), of N-alkanol perfluoroalkane sulfonamides such as N-butyl perfluorooctanesulfonamidoethyl acrylate, N-ethyl perfluorobutanesulfonamidoethyl methacrylate, N-methyl perfluorobutanesulfonamidobutyl acrylate and N-ethyl perfluorooctanesulfonamidoethyl α-chloroacrylate; of omega-perfluoroalkyl alkanols such as 1,1-dihydroperfluorohexyl acrylate, 1,1-dihydroperfluorodecyl methacrylate, 1,1 - dihydroproperfluorooctyl α-chloroacrylate, 3-(perfluorooctyl)-propyl acrylate, 11-(perfluorooctyl)-undecyl acrylate and 3-(perfluoroheptyl)-propyl chloroacrylate; and of 1,1,3-trihydroperfluoroalkanols such as 1,1,3-trihydroperfluorooctyl acrylate. Other types of monomers which are employed in preparing the polymers of the invention are 1,1-dihydroperfluoroalkyl acrylamides such as 1,1-dihydroperfluorooctyl acrylamide; 1,1-dihydroperfluoroalkyl vinyl ethers such as 1,1-dihydroperfluorohexyl vinyl ether; vinyl perfluoroalkyl ketones such as vinyl perfluorooctyl ketone; and allyl perfluoroalkyl ketones such as allyl perfluorooctyl ketone.

Among the epoxy group containing monomers suitable for use in the copolymer of the present invention (from which the epoxy group containing units of the polymers are formed) are glycidyl acrylate, glycidyl methacrylate, butadiene monoepoxide, vinyl 9,10-epoxystearate, vinyl glycidyl ether and allyl glycidyl ether. They can be mono- or polyunsaturated and the ethylenically unsaturated groups can be located in either terminal or internal positions in the compounds.

The polymers of the present invention may be cross-linked by treating them with a compound containing two or more groups capable of condensing with, or adding to, an epoxy group.

As noted previously, the copolymers can also contain recurring units which contain neither fluorocarbon groups nor epoxy groups. They are formed from ethylenically unsaturated monomers of corresponding structures. These monomers are free of groups which co-react with epoxy and include ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, halogenated styrenes, alkyl esters of acrylic acid, methacrylic acid and α-chloroacrylic acid methacrylonitrile, vinylcarbazole, vinyl pyrrolidone, vinyl pyridine, vinyl alkyl ethers, vinyl alkyl ketones, butadiene, chloroprene, fluoroprene and isoprene.

The copolymers of this invention are generally prepared using emulsion, bulk or solution polymerization techniques. Among the solvents which can be used as media in the solution polymerizations and as application solvents are trichlorofluoromethane, 1,1,2-trichloro-1,2,2-trifluoroethane, benzene, benzotrifluoride, xylene hexafluoride, 1,1,1-trichloroethane and butyl acetate. Such solvents are free of groups capable of reacting with epoxy groups.

In the treatment of fabrics, the copolymers of this invention may be applied prior to, subsequent to or in admixture with other treating agents, such as modified crease resisting resins, sizes, softeners, and water repellents.

The following examples are offered to furnish a better understanding of the present invention and are not to be construed as in any way limiting thereof. While the surface treatment portions of the examples relate to fabrics, it should be understood that other materials of the previously defined types can be treated in essentially analogous manners. All percentages are by weight unless otherwise specified.

The fluorinated monomers employed in the examples are:

(I)    $C_8F_{17}SO_2N(C_3H_7)C_2H_4OCOCH=CH_2$
(II)   $C_8F_{17}SO_2N(CH_3)C_{11}H_{22}OCOCH=CH_2$
(III)  $C_8F_{17}SO_2N(CH_3)C_{10}H_{20}OCOCH=CH_2$
(IV)  $C_8F_{17}SO_2N(CH_3)C_{11}H_{22}OCOC(CH_3)=CH_2$
(V)    $C_5F_{11}CH_2OCOC(CH_3)=CH_2$
(VI)   $C_7F_{15}CH_2OCOC(CH_3)=CH_2$

Methods of preparing these monomers are disclosed in U.S. Patents 2,803,615 and 2,642,416.

The procedure employed to prepare the polymers in ampoules in the examples involves the following sequence of steps:

(a) Charging the reactants to a heavy-walled Pyrex glass ampoule.
(b) Removing oxygen by freezing the ampoule and its contents in liquid air, and evacuating the ampoule to a pressure of less than 0.01 mm. mercury.
(c) Sealing the degassed ampoule.
(d) Warming the sealed ampoule until the contents are melted.
(e) Polymerizing the contents by placing the ampoule in an end-over-end rotator in a water bath at the indicated temperatures.

The procedure employed to prepare the polymers in screw cap bottles involves the following sequence of steps:

(a) Charging the reactants to a screw cap bottle equipped with a self-sealing rubber gasket.
(b) Removing oxygen by flushing the bottle with a stream of oxygen-free nitrogen gas.
(c) Sealing the bottle.
(d) Polymerizing the contents by placing in an end-over-end rotator in a water bath at the specified temperature and for the specified period of time.

The fabric treatments in the examples are as follows: The fabric is immersed in a pad bath (containing the ingredients as indicated), the fabrics are run through rubber squeeze rolls at a nip pressure of 30 p.s.i. and then cured.

The water repellency of the treated fabrics is measured by Standard Test No. 22–52, published in the 1952 Technical Manual and Yearbook of the American Association of Textile Chemists and Colorists, vol. XXVIII, page 136. The "spray rating" is expressed on a 0 to 100 scale, wherein 100 is the highest possible rating.

The oil repellency test is based on the different penetrating properties of two hydrocarbon liquids, mineral oil and n-heptane. Mixtures of these two liquids are miscible in all proportions and show penetrating properties which increase with an increase in the n-heptane content of the mixture. The oil repellency rating numbers used herein and the compositions of the corresponding test solutions are as follows:

| Oil Repellency Rating | Percent Heptane by Volume | Percent Mineral Oil by Volume |
|---|---|---|
| 150 | 100 | 0 |
| 140 | 90 | 10 |
| 130 | 80 | 20 |
| 120 | 70 | 30 |
| 110 | 60 | 40 |
| 100 | 50 | 50 |
| 90 | 40 | 60 |
| 80 | 30 | 70 |
| 70 | 20 | 80 |
| 60 | 10 | 90 |
| 50 | 0 | 100 |
| 0 |  | (¹) |

¹ No holdout to mineral oil.

To measure the oil repellency of a treated fabric, 3″ x 8″ swatches thereof are cut and placed flat on a table. A drop of each oil mixture is gently placed on the surface of the fabric. The number corresponding to that mixture containing the highest percentage heptane which does not penetrate or wet the fabric after three minutes contact is considered the oil repellency rating of the sample.

The laundering cycle referred to herein is as follows: The treated fabrics are laundered in a 9 lb. load, agitating, automatic washing machine using water at 140° F. and a commercial detergent and then tumble-dried in an automatic drier for 20 minutes at 190° F. before being tested. They are not ironed after drying.

The dry cleaning cycle referred to herein is as follows: The treated fabrics are dry cleaned in a commercial dry cleaning establishment using perchloroethylene containing a potassium oleate soap as the vehicle. They are not pressed after cleaning.

EXAMPLE 1

*Solution polymers of monomer I*

A. *Copolymer of monomer I and glycidyl acrylate.*—A glass ampoule is charged with 10 grams of monomer I $(C_8F_{17}SO_2N(C_3H_7)C_2H_4OCOCH=CH_2)$, 0.665 gram of glycidyl acrylate, 10 ml. of xylene hexafluoride and 0.1 gram of azobisisobutyronitrile and sealed. After 17 hours reaction at 65° C., a polymer is obtained which contains 47.3 percent by weight of fluorine and 0.78 percent by weight of oxirane oxygen.

B. *Homopolymer of monomer I.*—A glass ampoule is charged with 10 grams of monomer I, 10 ml. of xylene hexafluoride and 0.1 gram of azobisisobutyronitrile, sealed and reacted for 17 hours at 65° C. to form the polymer.

These solutions are diluted to 2% polymer solids with xylene hexafluoride and used to treat cotton fabric. The fabrics are then cured for 10 minutes at 140° C. Oil and spray ratings are measured initially and after extraction with xylene hexafluoride for 3 days in a Soxhlet flask. The results shown in Table I demonstrate the relative initial performance and durability achieved with these treatments.

TABLE I

| | Polymer | Initial Oil Rating | Initial Spray Rating | Oil Rating after Extraction |
|---|---|---|---|---|
| A | Monomer I, glycidyl acrylate copolymer. | 100 | 70 | 80 |
| B | Monomer I, homopolymer | 100 | 80 | 50 |

EXAMPLE 2

*Emulsion polymers of monomer I*

A. *Copolymer of monomer I and glycidyl acrylate.*—A glass ampoule is charged with 10 grams of monomer I, 0.665 gram of glycidyl acrylate, 13.5 grams of water, 4.5 grams of acetone, 0.5 gram of $$C_8F_{17}SO_2N(C_2H_5)CH_2COOK$$

and 0.05 gram $K_2S_2O_8$ and sealed. After 17 hours reaction at 65° C., an opaque, bluish-white latex is obtained. The polymer solids of this latex contain 47.3 percent by weight of fluorine and 0.78 percent by weight of oxirane oxygen.

B. *Homopolymer of monomer I.*—A glass ampoule is charged with 10 grams of monomer I, 13.5 grams of water, 4.5 grams of acetone, 0.5 gram of $$C_8F_{17}SO_2N(C_2H_5)CH_2COOK$$

and 0.05 gram $K_2S_2O_8$, sealed and reacted for 17 hours at 65° C. to form a clear polymeric latex.

These two latices are diluted to 2% polymer solids with water and used to treat cotton fabrics. The fabrics are then cured 10 minutes at 140° C. Oil and spray ratings are measured initially and after extraction with xylene hexafluoride for 3 days in a Soxhlet apparatus. The amount of fluorochemical on the fabric initially and after extraction is determined by fluorine analysis of the treated fabric. The results are shown in Table II.

TABLE II

| | Polymer | Initial | | | Extracted | |
|---|---|---|---|---|---|---|
| | | Oil rating | Spray rating | Percent Polymer on fabric | Oil rating | Percent Polymer on fabric |
| A | Monomer I, glycidyl acrylate copolymer | 100 | 70 | 1.9 | 100 | 1.6 |
| B | Monomer I, homopolymer | 100 | 70 | 1.8 | 50 | 0.5 |

Similar latexes are used to treat cotton, wool and wool/polyester fabrics. After initial properties are measured, the cotton samples are laundered and then retested. The results are shown in Table III.

TABLE III

| Polymer | Fabric | Initial Oil | Initial Spray | Oil after Laundering |
|---|---|---|---|---|
| Monomer I, glycidyl acrylate copolymer | Cotton | 100 | 70 | 80 |
| | Wool | 90 | 70 | |
| | Wool/polyester | 50 | 70 | |
| Monomer I, homopolymer | Cotton | 90 | 70 | 50 |
| | Wool | 70 | 80 | |
| | Wool/polyester | 0 | 70 | |

EXAMPLE 3

Solution polymers of monomer II

A. Copolymer of monomer II and glycidyl methacrylate.—A glass bottle is charged with 4.75 grams of monomer II $C_8F_{17}SO_2N(CH_3)C_{11}H_{22}OCOCH=CH_2$), 0.25 gram of glycidyl methacrylate, 9.0 grams of 1,1,1-trichloroethane and 0.025 gram of benzoyl peroxide and sealed. After 17 hours reaction at 75° C., a clear, viscous polymer solution is obtained. The polymer solids thereof contain 41.6 percent by weight of fluorine and 0.56 percent by weight of oxirane oxygen.

B. Homopolymer of monomer II.—A glass bottle is charged with 5 grams of monomer II, 9.0 grams of 1,1,1-trichloroethane and 0.025 gram of benzoyl peroxide, sealed and reacted for 17 hours reaction at 75° C. to form a clear, viscous polymeric solution.

These two solutions are diluted to 0.6% polymer solids with 1,1,1-trichloroethane and used to treat cotton, nylon, rayon and wool fabrics. After padding, the fabrics are cured for 5 minutes at 130° C. Oil and spray ratings are measured initially and after three launderings on some samples and three commercial dry cleanings on others. The results are given in Table IV.

with these solutions and cured 5 minutes at 130° C. Oil and spray ratings are measured initially, after laundering, after dry cleaning and after extraction with xylene hexafluoride for 24 hours in Soxhlet flask followed by a 5 minute dry at 130° C. The results are given in Table V.

TABLE V

| Polymer | Fabric | Initial | | Laundered and tumble dried | | Dry cleaned | | Extracted | |
|---|---|---|---|---|---|---|---|---|---|
| | | Oil | Spray | Oil | Spray | Oil | Spray | Oil | Spray |
| Monomer II, glycidyl methacrylate copolymer | Cotton | 130 | 100 | 90 | 70 | 130 | 100 | 100 | 100 |
| | Polyester | 120 | 100 | 80 | 100 | 120 | 100 | 50 | 80 |
| | Acrylic | 140 | 100 | 100 | 90 | 130 | 100 | 80 | 100 |
| | Nylon | 130 | 100 | 70 | 80 | 130 | 100 | 50 | 80 |
| | Rayon | 140 | 80 | 80 | 70 | 130 | 80 | 100 | 80 |
| Monomer II, homopolymer | Cotton | 120 | 90 | 60 | 70 | 130 | 80 | 0 | 50 |
| | Polyester | 120 | 100 | 80 | 100 | 120 | 100 | 0 | 50 |
| | Acrylic | 140 | 80 | 60 | 70 | 110 | 100 | 0 | 0 |
| | Nylon | 130 | 100 | 0 | 70 | 130 | 80 | 0 | 0 |
| | Rayon | 140 | 80 | 60 | 0 | 130 | 50 | 0 | 0 |

EXAMPLE

Solution polymers of monomer III

A. Copolymer of monomer III and glycidyl methacrylate.—A glass bottle is charged with 2.85 grams of monomer III, 0.15 gram of glycidyl methacrylate, 5.4 grams of 1,1,1,1-trichloroethane and 0.015 gram of benzoyl peroxide and sealed. After 19 hours reaction at 75° C., a polymer is obtained which contains 42.5 percent by weight of fluorine and 0.56 percent by weight of oxirane oxygen.

B. Homopolymer of monomer III.—A glass bottle is charged with 3 grams of monomer III, 5.4 grams of 1,1,1-trichloroethane and 0.015 gram of benzoyl peroxide, sealed and reacted for 21 hours at 75° C. to form the polymer.

These two solutions are diluted to 0.6% solids with 1,1,1-trichloroethane and used to treat cotton, nylon, rayon and wool fabrics. After padding the fabrics are cured 5 minutes at 130° C. Properties are measured initially and after three launderings or commercial dry cleanings. The results are shown in Table VI.

TABLE IV

| | Polymer | Fabric | Initial | | Laundered three times and tumble dried | | Dry cleaned three times | |
|---|---|---|---|---|---|---|---|---|
| | | | Oil | Spray | Oil | Spray | Oil | Spray |
| A | Monomer II, glycidyl methacrylate copolymer | Cotton | 120 | 100 | | | 130 | 80 |
| | | Nylon | 140 | 100 | 80 | 70 | | |
| | | Rayon | 130 | 90 | | | 140 | 80 |
| | | Wool | 140 | 100 | | | 130 | 90 |
| B | Monomer II, homopolymer | Cotton | 100 | 90 | | | 130 | 80 |
| | | Nylon | 140 | 100 | 0 | 50 | | |
| | | Rayon | 110 | 50 | | | 140 | 70 |
| | | Wool | 130 | 100 | | | 0 | 0 |

Similar polymer solutions (to those prepared above) are diluted to 1.0% polymer solids and 0.02% p-toluene sulfonic acid is added to each. Various fabrics are padded

TABLE VI

| | Polymer | Fabric | Initial | | Laundered three times and tumble dried | | Dry Cleaned three times | |
|---|---|---|---|---|---|---|---|---|
| | | | Oil | Spray | Oil | Spray | Oil | Spray |
| A | Monomer III, glycidyl methacrylate copolymer | Cotton | 110 | 100 | 80 | 50 | 110 | 80 |
| | | Nylon | 120 | 100 | | | 130 | 80 |
| | | Rayon | 130 | 90 | | | 130 | 80 |
| | | Wool | 140 | 100 | | | 110 | 70 |
| B | Monomer III, homopolymer | Cotton | 110 | 50 | 0 | 0 | 120 | 50 |
| | | Nylon | 130 | 100 | | | 90 | 50 |
| | | Rayon | 120 | 50 | | | 130 | 0 |
| | | Wool | 120 | 100 | | | 0 | 50 |

EXAMPLE 5

Solution polymers of monomer IV

A. *90:10 copolymer of monomer IV and glycidyl methacrylate.*—A glass ampoule is charged with 2.7 grams of monomer IV, 0.3 gram of glycidyl methacrylate, 9.0 grams of 1,1,1-trichloroethane and 0.015 gram of benzoyl peroxide and sealed. After 17 hours of reaction at 75° C., a polymer is obtained which contains 38.7 percent by weight of fluorine and 1.13 percent by weight of oxirane oxygen.

B. *95:5 copolymer of monomer IV and glycidyl methacrylate.*—A glass ampoule is charged with 2.85 grams of monomer IV, 0.15 gram of glycidyl methacrylate, 12 grams of 1,1,1-trichloroethane and 0.015 gram of benzoyl peroxide and sealed. After 17 hours of reaction at 75° C., a polymer is obtained which contains 41.0 percent by weight of fluorine and 0.563 percent by weight of oxirane oxygen.

C. *Homopolymer of monomer IV.*—A glass ampoule is charged with 3 grams of monomer IV, 12 grams of 1,1,1-trichloroethane and 0.015 gram of benzoyl peroxide, sealed and reacted for 17 hours at 75° C. to form the polymer.

These three solutions are diluted to 0.3% polymer solids and 0.03% p-toluene sulfonic acid is added. Cotton, nylon, rayon and wool cloths are padded with these solutions and cured 5 minutes at 130° C. Performances initially and after three commercial dry cleanings are compared in Table VII.

TABLE VII

| | Polymer | Fabric | Initial | | After three dry cleanings | |
|---|---|---|---|---|---|---|
| | | | Oil | Spray | Oil | Spray |
| A | 90:10 copolymer of Monomer IV and glycidyl methacrylate. | Cotton | 90 | 100 | 90 | 80 |
| | | Nylon | 120 | 100 | 110 | 80 |
| | | Rayon | 100 | 80 | 110 | 80 |
| | | Wool | 120 | 100 | 100 | 80 |
| B | 95:5 copolymer of Monomer IV and glycidyl methacrylate. | Cotton | 90 | 100 | 100 | 80 |
| | | Nylon | 120 | 100 | 110 | 50 |
| | | Rayon | 110 | 80 | 120 | 50 |
| | | Wool | 110 | 90 | 100 | 70 |
| C | Homopolymer of Monomer IV | Cotton | 70 | 80 | 120 | 70 |
| | | Nylon | 110 | 80 | 0 | 0 |
| | | Rayon | 90 | 50 | 120 | 50 |
| | | Wool | 100 | 90 | 50 | 70 |

EXAMPLE 6

Emulsion polymers of monomer V

A. *Copolymer of monomer V and glycidyl acrylate.*—A glass ampoule is charged with 8.96 grams of monomer V ($C_5F_{11}CH_2OCOC(CH_3)=CH_2$), 1.04 grams of glycidyl acrylate, 18.0 grams of distilled water, 0.5 gram of $C_8F_{17}SO_2N(C_2H_5)CH_2COOK$ and 0.05 gram of $K_2S_2O_8$ and sealed. After 17 hours reaction at 50° C., a clear blue latex is formed. The polymer solids thereof contain 51.2 percent fluorine by weight and 1.3 percent by weight of oxirane oxygen.

B. *Homopolymer of monomer V.*—A glass ampoule is charged with 10 grams of monomer V, 18 grams of distilled water, 0.5 gram of $C_8F_{17}SO_2N(C_2H_5)CH_2COOK$ and 0.05 gram of $K_2S_2O_8$, sealed and reacted for 17 hours at 50° C. to form a clear blue polymeric latex.

Another copolymer of monomer V and glycidyl acrylate (lot C) is prepared as in lot A above except that n-dodecyl trimethyl ammonium chloride is used in place of the fluorocarbon surfactant.

Similarly, another homopolymer of monomer V (lot D) is prepared by the process of lot B above except that n-dodecyl trimethyl ammonium chloride is used in place of the fluorocarbon surfactant.

These latices are diluted to 2% polymer solids and used to treat cotton and wool/polyester fabrics. After padding, the fabrics are cured 10 minutes at 140° C. Repellencies are measured initially and after laundering or dry cleaning. The results are given in Table VIII.

TABLE VIII

| | Polymer | Fabric | Initial Oil | Initial Spray | Oil after Laundering | Oil after dry cleaning |
|---|---|---|---|---|---|---|
| A | Monomer V, glycidyl acrylate copolymer | Cotton | 90 | 70 | 90 | |
| | | Wool/polyester | 90 | 100 | | 50 |
| B | Monomer V, homopolymer | Cotton | 100 | 50 | 0 | |
| | | Wool/polyester | 100 | 100 | | 0 |
| C | Monomer V, glycidyl acrylate copolymer | Cotton | 100 | 100 | 90 | |
| | | Wool/polyester | 100 | 100 | | 80 |
| D | Monomer V, homopolymer | Cotton | 90 | 100 | 0 | |
| | | Wool/polyester | 100 | 100 | | 0 |

EXAMPLE 7

Solution polymers of monomer VI

A. *Copolymer of monomer VI and glycidyl methacrylate.*—A glass ampoule is charged with 2.85 grams of monomer VI, 0.15 gram of glycidyl methacrylate, 12.0 grams of 1,1,2-trichloro-1,2,2-trifluoroethane and 0.03 gram of benzoyl peroxide and sealed. After 19 hours reaction at 75° C., a polymer is obtained which contains 59.3 percent by weight of fluorine and 0.56 percent by weight of oxirane oxygen.

B. *Homopolymer of $C_7F_{15}CH_2OCOC(CH_3)=CH_2$.*—A glass ampoule is charged with 3 grams of monomer VI, 12 grams of 1,1,2-trichloro-1,2,2-trifluoroethane and 0.03 gram of benzoyl peroxide, sealed and reacted for 19 hours at 75° C., to form the polymer.

These solutions are diluted to 1% polymer solids with benzotrifluoride/1,1,2-trichloro-1,2,2-trifluoroethane and 0.02% p-toluene sulfonic acid is added. Various fabrics are padded with these dilute solutions and cured 5 minutes at 130° C. Oil and spray ratings are measured initially, after laundering, after dry cleaning and, in some cases, after extraction with xylene hexafluoride for 24 hours in a Soxhlet apparatus followed by a 5 minute cure at 130° C. The results are given in Table IX.

TABLE IX

| Polymer | | Fabric | Initial | | Laundered and tumble dried | | Dry Cleaned | | Extracted | |
|---|---|---|---|---|---|---|---|---|---|---|
| | | | Oil | Spray | Oil | Spray | Oil | Spray | Oil | Spray |
| A | Monomer VI, glycidyl methacrylate copolymer | Cotton | 100 | 100 | 80 | 100 | 110 | 100 | 90 | 100 |
| | | Polyester | 100 | 100 | 80 | 100 | 100 | 90 | --- | --- |
| | | Acrylic | 110 | 100 | 90 | 100 | 110 | 100 | 70 | 100 |
| | | Nylon | 110 | 100 | 70 | 80 | 110 | 90 | --- | --- |
| | | Rayon | 110 | 90 | 60 | 50 | 115 | 80 | 60 | 70 |
| B | Monomer VI, homopolymer | Cotton | 100 | 100 | 0 | 0 | 80 | 80 | 0 | 0 |
| | | Polyester | 110 | 100 | 80 | 100 | 50 | 70 | --- | --- |
| | | Acrylic | 100 | 100 | 0 | 0 | 0 | 0 | 0 | 0 |
| | | Nylon | 100 | 90 | 0 | 0 | 0 | 0 | --- | --- |
| | | Rayon | 130 | 100 | 0 | 0 | 0 | 0 | 0 | 70 |

EXAMPLE 9

*Solution terpolymer of monomer IV, octadecyl methacrylate and glycidyl methacrylate*

A glass ampoule is charged with 1.95 grams of monomer IV, 0.75 gram of octadecyl methacrylate, 0.30 gram of glycidyl methacrylate, 12 grams of perchloroethylene and 0.015 gram of benzoyl peroxide and sealed. After 17 hours of reaction at 75° C., a clear, viscous solution is obtained. The polymer solids thereof contain 28.1 percent by weight of fluorine and 1.13 percent by weight of oxirane oxygen.

This terpolymer is diluted to 0.3% solids with perchloroethylene, 0.03% p-toluene sulfonic acid is added, and the resulting solution is used to treat cotton, nylon, rayon and wool fabrics. After padding the fabrics are cured for 5 minutes at 130° C. The following properties are obtained:

| Fabric | Initial | | 3 dry cleanings | |
|---|---|---|---|---|
| | Oil | Spray | Oil | Spray |
| Cotton | 80 | 90 | 80 | 80 |
| Nylon | 120 | 80 | 50 | 70 |
| Rayon | 90 | 80 | 90 | 70 |
| Wool | 120 | 80 | 80 | 80 |

Various other combinations of fluorocarbon group- and epoxy group-containing monomers may be employed in the preparation of the polymers of the invention. More than one monomer of either of these types may be included in the polymers, as may other monomers which include neither such group. Variations of the techniques of polymerization and of applying the polymers to the substrates can also be employed.

What is claimed is:

1. A copolymer of an ethylenically unsaturated fluorocarbon monomer and an ethylenically unsaturated epoxy group-containing monomer which is suitable for use as an oil- and water-repellent coating on a fibrous or porous surface, the copolymer having a carbon to carbon main chain and containing recurring monovalent perfluorocarbon groups containing from 4 to 18 carbon atoms and recurring epoxy groups, at least 20 percent of the weight of the polymer being contributed by fluorine atoms in the perfluorocarbon groups and at least 0.05 percent of the weight of the polymer being contributed by oxirane oxygen, said copolymer having improved surface adherability properties as compared to the homopolymer of the same fluorocarbon monomer.

2. A polymer according to claim 1 which contains recurring monovalent unit groups derived from an acrylate-type ester of an N-alkanol perfluoroalkanesulfonamide.

3. A polymer according to claim 1 which contains recurring monovalent unit groups derived from an acrylate-type ester of an omega-perfluoroalkyl alkanol.

4. A polymer according to claim 2 wherein the ester has the formula:

$$C_8F_{17}SO_2N(C_3H_7)C_2H_4OCOCH=CH_2$$

5. A polymer according to claim 2 wherein the ester has the formula:

$$C_8F_{17}SO_2N(CH_3)C_{11}H_{22}OCOCH=CH_2$$

6. A polymer according to claim 2 wherein the ester has the formula:

$$C_8F_{17}SO_2N(CH_3)C_{10}H_{22}OCOCH=CH_2$$

7. A polymer according to claim 2 wherein the ester has the formula:

$$C_8F_{17}SO_2N(CH_3)C_{11}H_{22}OCOC(CH_3)=CH_2$$

8. A polymer according to claim 3 wherein the ester has the formula:

$$C_5F_{11}CH_2OCOC(CH_3)=CH_2$$

9. A polymer according to claim 3 wherein the ester has the formula:

$$C_7F_{15}CH_2OCOC(CH_3)=CH_2$$

10. A solution of a polymer according to claim in an organic solvent.

11. A solution of a polymer according to claim 2 in an organic solvent.

12. A solution of a polymer according to claim 3 in an organic solvent.

13. A textile fabric which has been sized with a solution of an organic solvent containing a polymer according to claim 1 so as to have been rendered oil repellent.

14. A textile fabric which has been sized with a solution of an organic solvent containing a polymer according to claim 2 so as to have been rendered oil repellent.

15. A textile fabric which has been sized with a solution of an organic solvent containing a polymer according to claim 3 so as to have been rendered oil repellent.

16. Fibers coated with a polymer according to claim 1 so as to have been rendered oil repellent.

17. Fibers coated with a polymer according to claim 2 so as to have been rendered oil repellent.

18. Fibers coated with a polymer according to claim 3 so as to have been rendered oil repellent.

19. A latex of a polymer according to claim 1.

20. A latex of a polymer according to claim 2.

21. A latex of a polymer according to claim 3.

References Cited
UNITED STATES PATENTS

| 2,962,392 | 11/1960 | Haycock et al. | 117—139.5 |
| 2,971,947 | 2/1961 | Floria et al. | 260—79.3 |
| 2,984,587 | 5/1961 | Matter et al. | 117—139.5 |
| 3,031,435 | 4/1962 | Tesoro | 260—79.3 |
| 3,277,039 | 10/1966 | Marascia | 260—86.3 |

JOSEPH L. SCHOFER, *Primary Examiner.*

J. McNALLY, D. K. DENENBERG,
*Assistant Examiners.*

UNITED STATES PATENT OFFICE
CERTIFICATE OF CORRECTION

Patent No. 3,329,661                          July 4, 1967

Samuel Smith et al.

It is hereby certified that error appears in the above numbered patent requiring correction and that the said Letters Patent should read as corrected below.

Column 7, line 6, for "$C_8F_{17}SO_2N(CH_3)C_{11}H_{22}OCOCH=CH_2)$" read -- $(C_8F_{17}SO_2N(CH_3)C_{11}H_{22}OCOCH=CH_2)$ --; column 8, line 23, for "Example" read -- Example 4 --; column 8, line 29, for "1,1,1-trichloroethane" read -- 1,1,1-trichloroethane --; column 12, line 25, for "$C_8F_{17}SO_2N(CH_3)C_{10}H_{22}OCOCH=CH_2$" read -- $C_8F_{17}SO_2N(CH_3)C_{10}H_{20}OCOCH=CH_2$ --; line 38, after "claim" insert -- 1 --.

Signed and sealed this 15th day of October 1968.

(SEAL)
Attest:

EDWARD M. FLETCHER, JR.                      EDWARD J. BRENNER
Attesting Officer                            Commissioner of Patents